(12) United States Patent
Rosendahl

(10) Patent No.: US 7,642,670 B2
(45) Date of Patent: Jan. 5, 2010

(54) CONTROLLING POWER SUPPLY TO VEHICLES THROUGH A SERIES OF ELECTRICAL OUTLETS

(76) Inventor: Glenn Rosendahl, Box 334, Elie, Manitoba (CA) R0H 0H0

( * ) Notice: Subject to any disclaimer, the term of this patent is extended or adjusted under 35 U.S.C. 154(b) by 387 days.

(21) Appl. No.: 11/837,849

(22) Filed: Aug. 13, 2007

(65) Prior Publication Data

US 2009/0045676 A1      Feb. 19, 2009

(51) Int. Cl.
     *H02G 3/18* (2006.01)
(52) U.S. Cl. ......................... 307/9.1; 307/10.1
(58) Field of Classification Search .......... 307/9.1, 307/10.1; 180/54.1, 65.31, 69.6; 701/36
     See application file for complete search history.

(56) References Cited

U.S. PATENT DOCUMENTS

| | | | |
|---|---|---|---|
| 4,532,418 A | 7/1985 | Meese | |
| 5,121,044 A * | 6/1992 | Goldman | 320/109 |
| 5,521,838 A | 5/1996 | Rosendahl | |
| 5,563,491 A | 10/1996 | Tseng | |
| 5,903,064 A | 5/1999 | Norberg | |
| 6,552,888 B2 * | 4/2003 | Weinberger | 361/57 |
| 6,614,214 B2 | 9/2003 | Pelegrino | |
| 6,986,398 B2 * | 1/2006 | Obayashi | 180/65.28 |
| 7,064,658 B2 * | 6/2006 | Burlak et al. | 340/428 |
| 7,119,454 B1 * | 10/2006 | Chiao | 307/9.1 |
| 7,145,788 B2 * | 12/2006 | Plummer | 363/141 |
| 7,231,262 B2 * | 6/2007 | Hollis et al. | 700/14 |
| 7,235,898 B1 * | 6/2007 | Jones et al. | 307/9.1 |

* cited by examiner

*Primary Examiner*—Albert W Paladini
(74) *Attorney, Agent, or Firm*—Adrian D. Battison; Ade & Company Inc.

(57) ABSTRACT

A system for supplying electrical power to a plurality of vehicles from a central power supply through a plurality of electrical outlets includes an outlet control unit for each of the outlets and a vehicle control unit for each of the vehicles. The outlet microprocessor switches the supply of power to the outlet to communicate data to the vehicle. The vehicle microprocessor communicates data by switching a load across the power supply to provide interaction between the microprocessors to manage requirement and availability of power. The data includes whether the power plant of the vehicle is gasoline powered, diesel powered, hybrid or electric battery powered. The microprocessor of the vehicle control unit is arranged to control switches which supply power to selected loads in the vehicle and includes an interface which is arranged to connect to a Canbus communication system of the vehicle.

19 Claims, 3 Drawing Sheets

CONTROLLING POWER SUPPLY TO VEHICLES THROUGH A SERIES OF ELECTRICAL OUTLETS

BACKGROUND OF THE INVENTION

In colder regions of the globe electrical devices are used to heat automobile engines and interiors to facilitate engine starting and user comfort. Energy costs and conservation efforts have led to the widespread use of parking lot controls. These controls are designed to reduce energy consumption while still satisfying engine starting and user comfort constraints. Numerous algorithms have been devised to limit this consumption, ranging from simple timers to the most current proportional temperature controls (the colder it gets the more power is delivered).

Current parking lot controls are centralized, whereby all the loads of a parking lot are switched together on or off by a central contactor. Many inherent restrictions and limitations are imposed by this form of centralized control. Central contactor controls carry substantial installation and maintenance costs, with typical installation pay back periods in the order of five years or more. The longevity of mechanical contactors depend heavily on regular maintenance adding to operational costs.

Many lots impose a limit on power use for each vehicle. But since no adequate means of enforcement exists, it is left open to abuse. Often enough users abuse the set limits to trip the main breaker for a lot, inconveniencing all patrons. In addition, individual parking stall breakers are tripped due to temporary short circuits, overloads, etc. Since no feedback as to the presence of power is provided for users or maintenance personnel, this stall maybe without power for several days.

U.S. Pat. No. 5,521,838 by the present inventor issued May 28$^{th}$ 1996 discloses an apparatus for controlling and monitoring electrical automobile heating loads for the purpose of energy conservation. By fitting each outlet box (which controls two stalls) of a parking lot with a reprogramable microcontroller greater flexibility is realized. One novel feature included is the ability to detect each load as it is asserted or removed. This enables the device to delay delivery of power to a newly asserted load for sometime. By including apparatus for sensing current being delivered to each load another dimension in control is added. This enables the effective enforcement of power consumption limits for each vehicle, assisting in local demand power management. Maintenance costs are reduced and user service is increased by the detection of overloads or short circuits. Enabling these loads to be switched "off" before the associated breaker can trip. Added safety is provided by helping to prevent faulty loads from starting fires or damaging property. This apparatus enables the use of economical solid-state contactors for delivering power to attached loads, reducing maintenance costs and boosting reliability.

Feedback to patrons is provided by visual or auditory apparatus. In the case of visual feedback two light emitting diodes (LED's) are provided, one green the other red for each stall. As an example, when a user asserts a load the presence of power is identified by a quick flash of the green LED (load within acceptable limits) or the red LED is lit solidly (overload is rejected). For auditory feedback different tones identify load acceptance or rejection and the presence of power.

A bi-directional infrared data communication interface for communication with service personnel. From time to time general maintenance of parking lots are performed requiring power tools. To facilitate this whole parking lots are disabled with centralized controls. While with the present invention only required individual outlets need be disabled. With this data link operational modes and limits can be easily set and changed. Since this link is bi-directional the device can be used to collect operational data to be down loaded periodically at request.

An interface is provided to allow the microcontrollers program or firmware to be changed, making it field programmable. This increases the useful life and reduces manufacture costs. Useful life is increased by the fact the energy conservation algorithms can be kept up to date and customized to a particular application. Manufacturing costs are reduced by having to produce only one generic model. And by reprogramming the devices with self test and calibration routines, manufacture costs are further reduced.

U.S. Pat. No. 5,903,064 Norberg issued May 11$^{th}$ 1999 discloses communication from a vehicle mounted control unit to the an outlet control unit using signals communicated through the power cord and through the distribution network between the outlets to a central unit at a central power source. The communication is used to allow an alarm function on disconnection, authorization of use and billing. The outlet control unit can also detect state of charging. The system is connected using a series arrangement.

U.S. Pat. No. 4,532,418 Meese issued Jul. 30$^{th}$ 1985 discloses a combined battery charging system and parking meter for vehicles which allows billing using a charge card system.

U.S. Pat. No. 6,614,214 Pelegrino issued Sep. 2$^{nd}$ 2003 discloses a battery charging system for vehicles which allows billing using an optical reader.

U.S. Pat. No. 5,563,491 Tseng issued Oct. 8$^{th}$ 1996 discloses a combined battery charging system and parking meter which allows billing using a radio transmitter system.

SUMMARY OF THE INVENTION

It is one object of the invention to provide an improved system of the above type.

According to one aspect of the invention there is provided an apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:

at least one electrical outlet;

a microprocessor;

and a switch operable by the microprocessor for selectively supplying power from the central power supply to said at least one electrical outlet;

the vehicle control unit comprising:

an input cable for connection to the electrical outlet;

a power supply connection for supplying power from the outlet to one or more loads in the vehicle;

a microprocessor;

and a load connected by a switch so as to apply the load across the power supply from the outlet control unit;

the microprocessor of the vehicle control unit being arranged to operate the switch so as to communicate data along the cable to the outlet control unit.

Preferably the microprocessor of the vehicle control unit has a data storage containing data relating to the type of power plant of the vehicle for communication to the outlet control unit.

Preferably the microprocessor of the vehicle control unit has a data storage containing data relating to whether the power plant of the vehicle is gasoline powered, diesel powered, hybrid or electric battery powered.

Preferably the microprocessor of the vehicle control unit is arranged to control switches which supply power to selected loads in the vehicle.

Preferably the microprocessor includes an interface which is arranged to connect to a Canbus communication system of the vehicle.

Preferably the microprocessor of the outlet control unit is arranged to communicate to the microprocessor of the vehicle control unit by switching on and off the power supply.

Preferably the microprocessor of the outlet control unit is arranged to communicate to the microprocessor of the vehicle control unit to provide interaction between the microprocessors to manage requirement and availability of power.

According to a second aspect of the invention there is provided an apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:

at least one electrical outlet;

a microprocessor;

and a switch operable by the microprocessor for selectively supplying power from the central power supply to said at least one electrical outlet;

the vehicle control unit comprising:

an input cable for connection to the electrical outlet;

a power supply connection for supplying power from the outlet to one or more loads in the vehicle;

a microprocessor;

the microprocessor of the vehicle control unit being arranged to communicate data to the outlet control unit;

wherein the microprocessor of the vehicle control unit has a data storage containing data relating to the type of power plant of the vehicle for communication to the outlet control unit.

According to a third aspect of the invention there is provided an apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:

at least one electrical outlet;

a microprocessor;

and a switch operable by the microprocessor for selectively supplying power from the central power supply to said at least one electrical outlet;

the vehicle control unit comprising:

an input cable for connection to the electrical outlet;

a power supply connection for supplying power from the outlet to one or more loads in the vehicle;

a microprocessor;

the microprocessor of the vehicle control unit being arranged to communicate data to the outlet control unit.

wherein the microprocessor of the vehicle control unit is arranged to control switches which supply power to selected loads in the vehicle.

According to a fourth aspect of the invention there is provided an apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:

at least one electrical outlet;

a microprocessor;

and a switch operable by the microprocessor for selectively supplying power from the central power supply to said at least one electrical outlet;

the vehicle control unit comprising:

an input cable for connection to the electrical outlet;

a power supply connection for supplying power from the outlet to one or more loads in the vehicle;

a microprocessor;

the microprocessor of the vehicle control unit being arranged to communicate data to the outlet control unit.

wherein the microprocessor includes an interface which is arranged to connect to a Canbus communication system of the vehicle.

According to a fifth aspect of the invention there is provided an apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:

at least one electrical outlet;

a microprocessor;

and a switch operable by the microprocessor for selectively supplying power from the central power supply to said at least one electrical outlet;

the vehicle control unit comprising:

an input cable for connection to the electrical outlet;

a power supply connection for supplying power from the outlet to one or more loads in the vehicle;

a microprocessor;

the microprocessor of the vehicle control unit being arranged to communicate data to the outlet control unit.

wherein the microprocessor of the outlet control unit is arranged to communicate to the microprocessor of the vehicle control unit to provide interaction between the microprocessors to manage requirement and availability of power.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The following description is taken from the above patent of the present inventor, the complete disclosure of which is incorporated herein by reference, to describe the context of the present invention.

Figure 1:
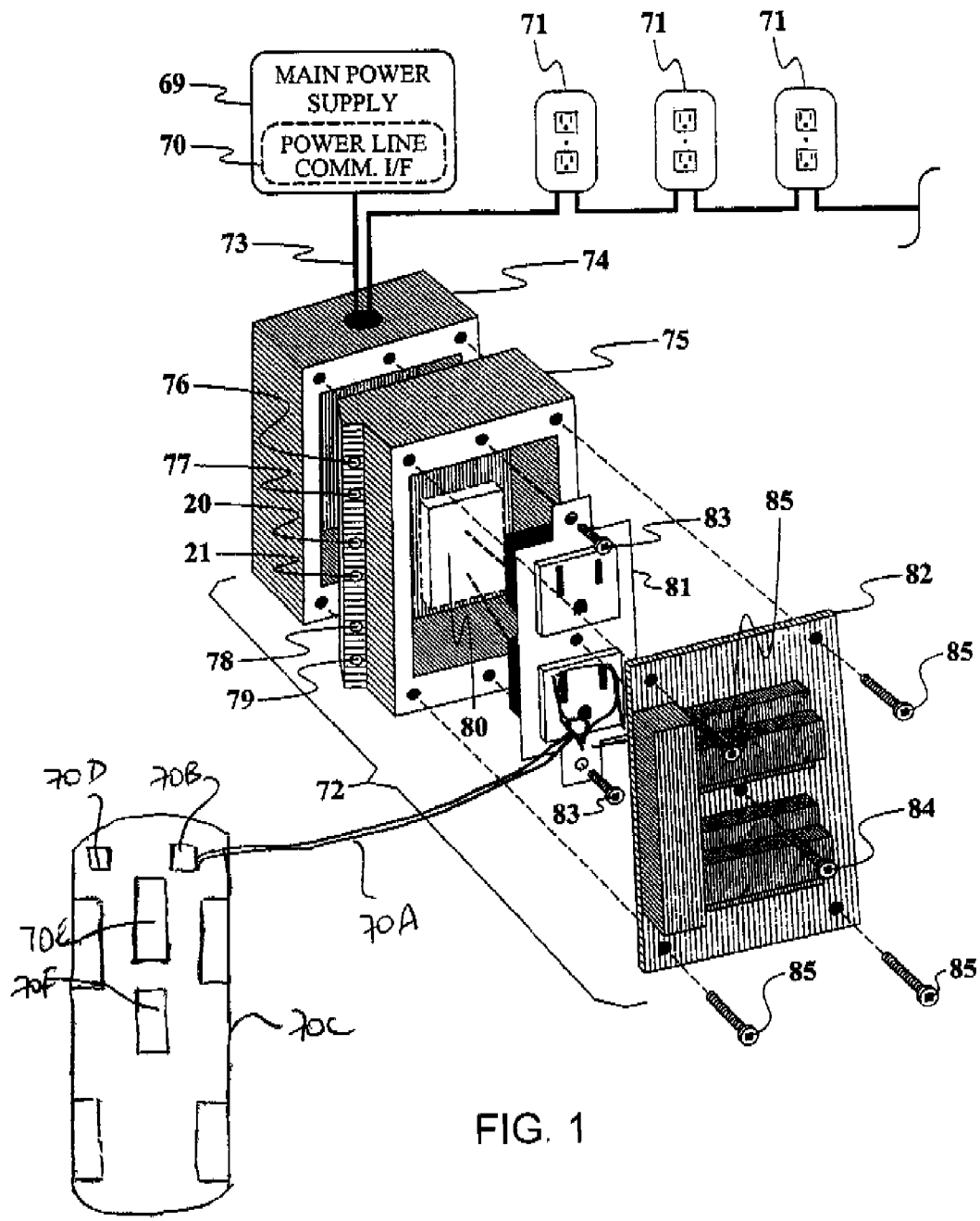
FIG. 1 is a schematic illustration of the system according to the present invention which is partly taken from FIG. 7 of the above patent of the present inventor.

In FIG. 1 is shown an overview of the whole system which includes a main power supply 69 for supplying electrical power to a plurality of outlets 71, most of which are shown only schematically but one of which indicated at 72 is shown in an exploded isometric view. The electrical power is supplied through wiring 73 which is again shown only schematically without distinguishing between the hot, neutral or ground wires.

The main power supply comprises basically only a main breaker and possibly a number of subsidiary breakers to a number of different circuits depending upon the number of outlets to be supplied.

It is a conventional practice to provide the outlet as paired outlets with each pair within a separate receptacle mounted at a spaced position around the car park to be supplied. The one outlet illustrated in detail therefore comprises a metal box or receptacle 74 which is mounted on a suitable support for example of wooden post, fencing or the like. The receptacle 74 has an open front face which can receive a rectangular extension box module 75 which in turn carries a standard duplex outlet 81 and cover plate 82. The extension box module is fastened in place by a conventional screw arrangement 85 which connects with screw holes supplied on the receptacle 75. The standard outlet 81 is fastened to the receptacle 74 through holes provided by the extension box module 75 in a standard arrangement by screws 83. The standard cover plate 82 is fastened by screws 85 and/or 84. A suitable gasket or other sealing arrangement can be provided to prevent moisture penetration but this is not illustrated as it is well known to one skilled in the art.

The extension box module 75 contains a control unit 80 which enables the independent control of each outlet of an attached duplex outlet 81. A conventional electrical terminal arrangement is provided on the rear face of the extension box module 75 so as to be insertable into the receptacle 74 for electrical supply connection, protection, and containment thereby. Wires are provided within the open front face of the extension box module 75 so as to enable the standard connection of a standard duplex outlet 81.

The control of the power supply to each outlet is effected by the control unit 80 contained within the extension box module 75, without the necessity for any central control intelligence. In this way the system can be implemented into existing receptacles and wiring simply by inserting the extension box module 75 between the conventional outlet 81 cover plate 82 and the supply receptacle 74. This allows installation at a relatively inexpensive price. In addition individual programming of the outlets can be provided.

On the side facing forward of the extension box module is also shown a first LED 76, 79 which is green for indicating normal or proper operation of the power supply after application of a load. A second LED indicated at 77, 78 is red and this is used to indicate an unacceptable load as described hereinafter. Further ports 20 and 21 are provided for bi-directional communication as again described hereinafter.

A power supply cord 70A connects power from the outlet 81 to a vehicle control unit 70B in a vehicle 70C for supplying power to a battery 70D and other components 70E and 70F in the vehicle.

Figure 2:
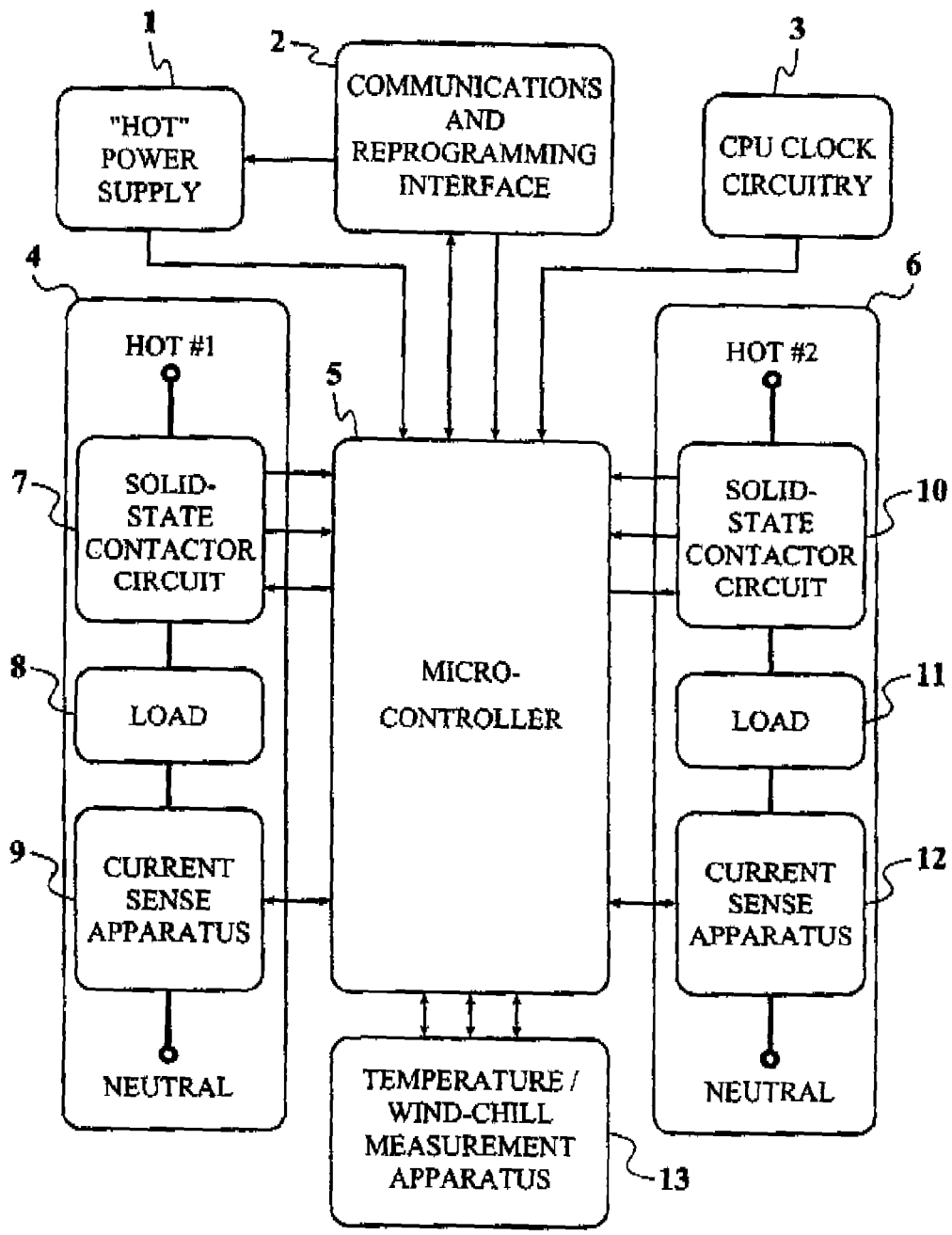
FIG. 2 is a schematic illustration of the outlet control unit of FIG. 1 which is taken from FIG. 1 of the above patent of the present inventor.

An overall block diagram of the outlet control unit is shown in FIG. 2. The "Hot" power supply 1 supplies all the required power for normal operation of the device. Communication and reprogramming features are supplied by the infrared communications and reprogramming interface 2. The system operation clock for the microcontroller 5 is provided by the CPU clock circuitry 3. The microcontroller 5 controls both outlets of a dual outlet receptacle through the outlet interfaces 4 and 6. Each outlet interface is identical in construction composed of solid-state contactor circuits 7 and 10, a standard outlet where electrical loads may be attached 8 and 11 and current sense apparatus 9 and 12. The temperature/wind-chill measurement apparatus 13 enables the microcontroller 5 to measure the ambient temperature or wind-chill. Together these circuits provide a novel and particularly useful function for the purpose of energy conservation.

Figure 3:
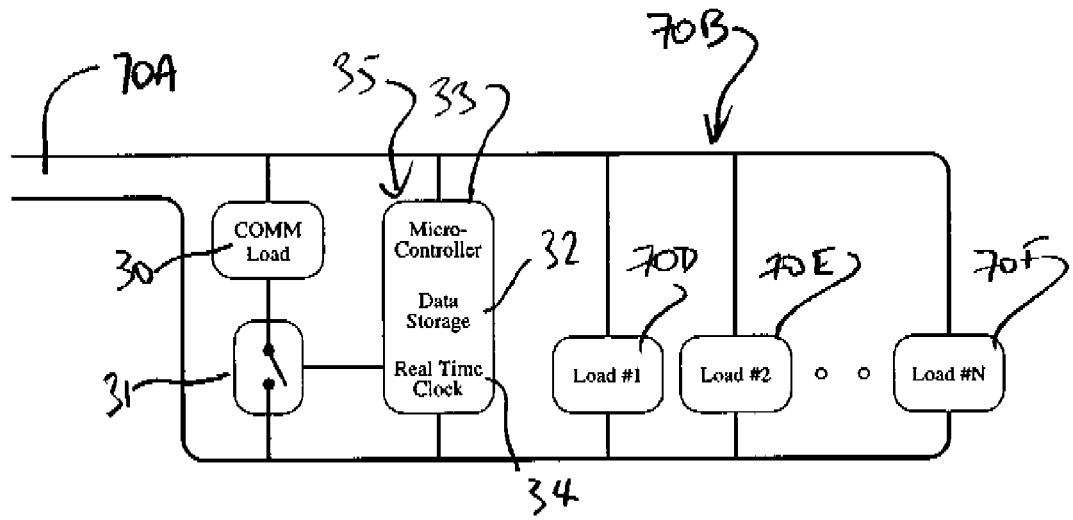
FIG. 3 is a schematic illustration of one embodiment of the vehicle control unit of FIG. 1.

In FIG. 3 is shown one implementation of the vehicle control unit 70B of FIG. 1 which consists of a combination of a communication load 30 and switch 31 connected across the conductors of the cable 70A to provide a load modulation mechanism for data communication to the outlet control unit of FIG. 1. A module 35 contains a Micro-controller 33, Data Storage 34, and Real Time Clock 36 which provides the information to communicate to the outlet control unit. The Data Storage holds information about the load or loads defined by the components 70D, 70E and 70F of the vehicle which are programmed by the user or operator of the vehicle through the microprocessor. This information can include the following 1. identification of the type of vehicle (gasoline, diesel, hybrid, etc).
2. energy v temperature requirements,
3. what days and hours this vehicle is to be used or ready to be used,
4. what size the load should be,
5. and any other information that is deemed to be important to a load.

Any number of vehicle loads 70D, 70E and 70F are attached in parallel. This implementation does not include switches for each attached load to save on cost.

The AC power lines 70A from the extension cord enters on the left hand side into the circuit. The Micro-controller 33, Data storage 34, and Real Time Clock unit 35 controls the switch 31 of the COMM load 30. When this switch is closed;

the COMM load is added to Loads 70D, 70E and 70F on the AC line. When this switch is open; the COMM load is not added to Loads on the AC line. By closing and opening this switch the load size presented to the AC line is modulated by the size of the COMM load. This signal is read by the outlet control unit of FIG. 2 by the microcontroller 5.

This information when communicated to the micro-controller 5 can be used to control the time of supply and the allowed current supplied to the vehicle to accommodate the expected loads. Thus it will be appreciated that a gasoline engine and the battery for a gasoline engine will have different temperature and power characteristics from a diesel engine and from a hybrid engine. It is well known that diesel engines require the engine to be heated to maintain the engine at temperatures above freezing to ensure starting whereas gasoline engines can tolerate a much lower temperature before starting difficulties arise. Hybrid engines and the batteries for them require different characteristics of power supply for charging the power batteries. Yet further electric motor powered vehicles have yet further different characteristics. All of these requirements can be stored in the micro-controller 5 and the characteristic communicated by the micro-controller 35 along the cable 70A by the switch 31 connecting and disconnecting the load 30.

Turning now to FIG. 3, this arrangement is similar to that if FIG. 2 with the addition of switches 37, 38 and 39 to the loads which are controlled by the microcontroller 35 and the provision of a CAN BUS interface connected to the microcontroller 35. The CAN BUS interface allows the microcontroller 35 to communicate with the control systems of the vehicle using the CAN BUS conventional communications protocol to exchange information therewith or to obtain data therefrom.

The Micro-controller 35 is connected to the AC power line 70A delivered by the outlet control unit. In this way the Micro-controller can sense when AC power is on and when it is off. The outlet control unit can therefore communicate to this Micro-controller by turning on and off the AC power forming a low baud rate bit stream. Power for the Micro-controller 35 can be derived from the AC power supply and/or a local battery.

The addition of a CAN BUS interface enables the Micro-controller to communicate with the vehicles onboard computer systems and sensors. With the addition of the switches 37, 28 and 39 to control N different loads various electrical systems on the vehicle maybe controlled. Using the information from the CAN BUS interface various loads can be included or excluded depending on their individual power requirements and depending on the power available. And in this way only electrical subsystems which require power are powered, increasing the potential power savings. It will be appreciated therefore that the power available on the system to the individual outlets will vary depending the number of vehicles connected at any one time and on the total power required. The smart outlet control unit can therefore manage this available power in the best manner. At the same time, the power available to the individual vehicle will vary and the smart vehicle control unit can manage this power in the best manner by supplying it to the loads most requiring the power.

Communications between the two units of power available and power required will allow the system as a whole to be managed for best power savings and for best power management.

Figure 4:
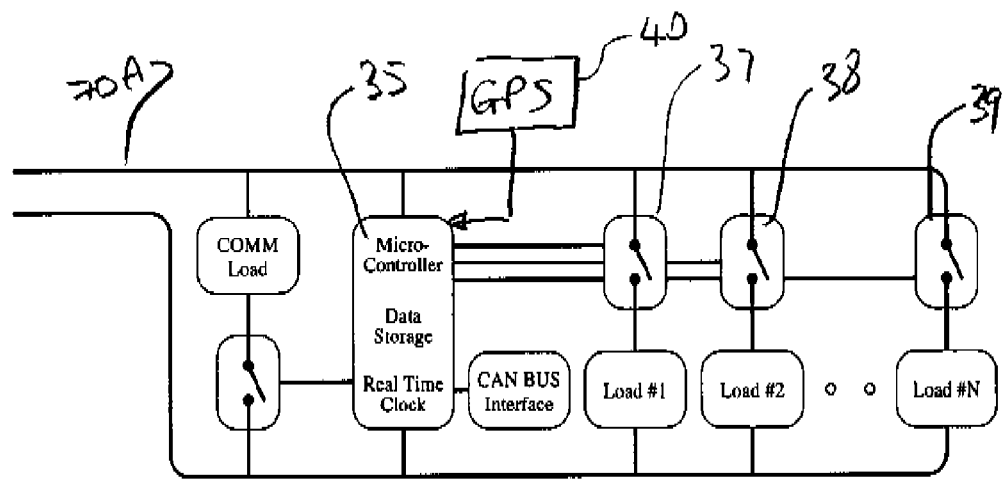
FIG. 4 is a schematic illustration of a second more complex embodiment of the vehicle control unit of FIG. 1.

The vehicle as shown in FIG. 4 includes a GPS receiving system 40 which communicates into the micro-controller 35. The GPS system can be used to generate records in the micro-controller 35 indicating information such as where and how far the vehicle travels between plug-in times. This information can be relayed via the vehicle control unit and the outlet control unit and can serve to update records at the central location relating to maintenance or scheduling, delivery route planning, abuse monitoring, etc. The real time clock 34 in the vehicle control unit and the time clock 3 in the outlet control unit can thus be set without user intervention using the GPS satellite system. Both the current time as well as time zone can be updated without user intervention using the GPS system as an input.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:
   an outlet control unit for mounting in a respective one of the electrical outlet receptacles;
   and a vehicle control unit for mounting in a respective one of the vehicles;
   the outlet control unit comprising:
      at least one electrical outlet;
      a microprocessor;
      and a switch operable by the microprocessor for selectively supplying power from the central power supply to said at least one electrical outlet;
   the vehicle control unit comprising:
      an input cable for connection to the electrical outlet;
      a power supply connection for supplying power from the outlet to one or more loads in the vehicle;
      a microprocessor;
      and a load connected by a switch so as to apply the load across the power supply from the outlet control unit;
      the microprocessor of the vehicle control unit being arranged to operate the switch so as to communicate data along the cable to the outlet control unit.

2. The apparatus according to claim 1 wherein the microprocessor of the vehicle control unit has a data storage containing data relating to the type of power plant of the vehicle for communication to the outlet control unit.

3. The apparatus according to claim 1 wherein the microprocessor of the vehicle control unit has a data storage containing data relating to whether the power plant of the vehicle is gasoline powered, diesel powered, hybrid or electric battery powered.

4. The apparatus according to claim 1 wherein the microprocessor of the vehicle control unit is arranged to control switches which supply power to selected loads in the vehicle.

5. The apparatus according to claim 1 wherein the microprocessor includes an interface which is arranged to connect to a Canbus communication system of the vehicle.

6. The apparatus according to claim 1 wherein the microprocessor of the outlet control unit is arranged to communicate to the microprocessor of the vehicle control unit by switching on and off the power supply.

7. The apparatus according to claim 1 wherein the microprocessor of the outlet control unit is arranged to communicate to the microprocessor of the vehicle control unit to provide interaction between the microprocessors to manage requirement and availability of power.

8. Apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:
at least one electrical outlet;
a microprocessor;
and a switch operable by the microprocessor for selectively supplying power from the central power supply to said at least one electrical outlet;

the vehicle control unit comprising:
an input cable for connection to the electrical outlet;
a power supply connection for supplying power from the outlet to one or more loads in the vehicle;
a microprocessor;
the microprocessor of the vehicle control unit being arranged to communicate data to the outlet control unit;
wherein the microprocessor of the vehicle control unit has a data storage containing data relating to the type of power plant of the vehicle for communication to the outlet control unit.

9. The apparatus according to claim 8 wherein the microprocessor of the vehicle control unit has a data storage containing data relating to whether the power plant of the vehicle is gasoline powered, diesel powered, hybrid or electric battery powered.

10. The apparatus according to claim 8 wherein the microprocessor of the vehicle control unit is arranged to control switches which supply power to selected loads in the vehicle.

11. The apparatus according to claim 8 wherein the microprocessor includes an interface which is arranged to connect to a Canbus communication system of the vehicle.

12. The apparatus according to claim 8 wherein the microprocessor of the outlet control unit is arranged to communicate to the microprocessor of the vehicle control unit by switching on and off the power supply.

13. The apparatus according to claim 8 wherein the microprocessor of the outlet control unit is arranged to communicate to the microprocessor of the vehicle control unit to provide interaction between the microprocessors to manage requirement and availability of power.

14. Apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:
at least one electrical outlet;
a microprocessor;
and a switch operable by the microprocessor for selectively supplying power from the central power supply to said at least one electrical outlet;

the vehicle control unit comprising:
an input cable for connection to the electrical outlet;
a power supply connection for supplying power from the outlet to one or more loads in the vehicle;
a microprocessor;
the microprocessor of the vehicle control unit being arranged to communicate data to the outlet control unit.
wherein the microprocessor of the vehicle control unit is arranged to control switches which supply power to selected loads in the vehicle.

15. The apparatus according to claim 14 wherein the microprocessor includes an interface which is arranged to connect to a Canbus communication system of the vehicle.

16. The apparatus according to claim 14 wherein the microprocessor of the outlet control unit is arranged to communicate to the microprocessor of the vehicle control unit by switching on and off the power supply.

17. The apparatus according to claim 14 wherein the microprocessor of the outlet control unit is arranged to communicate to the microprocessor of the vehicle control unit to provide interaction between the microprocessors to manage requirement and availability of power.

18. Apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:
at least one electrical outlet;
a microprocessor;
and a switch operable by the microprocessor for selectively supplying power from the central power supply to said at least one electrical outlet;

the vehicle control unit comprising:
an input cable for connection to the electrical outlet;
a power supply connection for supplying power from the outlet to one or more loads in the vehicle;
a microprocessor;
the microprocessor of the vehicle control unit being arranged to communicate data to the outlet control unit.
wherein the microprocessor includes an interface which is arranged to connect to a Canbus communication system of the vehicle.

19. Apparatus for supplying electrical power to a plurality of vehicles from a central power supply through a plurality of electrical outlet receptacles to which the vehicles are brought and at which they remain stationary for a period during which the power is supplied through an electrical connection cable connected from the vehicle to a respective one of the electrical outlet receptacles, the apparatus comprising:

an outlet control unit for mounting in a respective one of the electrical outlet receptacles;

and a vehicle control unit for mounting in a respective one of the vehicles;

the outlet control unit comprising:
at least one electrical outlet;

a microprocessor;

and a switch operable by the microprocessor for selectively supplying power from the central power supply to said at least one electrical outlet;

the vehicle control unit comprising:

an input cable for connection to the electrical outlet;

a power supply connection for supplying power from the outlet to one or more loads in the vehicle;

a microprocessor;

the microprocessor of the vehicle control unit being arranged to communicate data to the outlet control unit.

wherein the microprocessor of the outlet control unit is arranged to communicate to the microprocessor of the vehicle control unit to provide interaction between the microprocessors to manage requirement and availability of power.

* * * * *